(12) United States Patent
Crain

(10) Patent No.: US 10,136,623 B2
(45) Date of Patent: Nov. 27, 2018

(54) RATTLING FISH HOOK

(71) Applicant: Thomas Vernon Crain, Dallas, TX (US)

(72) Inventor: Thomas Vernon Crain, Dallas, TX (US)

(*) Notice: Subject to any disclaimer, the term of this patent is extended or adjusted under 35 U.S.C. 154(b) by 81 days.

(21) Appl. No.: 14/191,889

(22) Filed: Feb. 27, 2014

(65) Prior Publication Data
US 2014/0290118 A1 Oct. 2, 2014

Related U.S. Application Data

(60) Provisional application No. 61/853,082, filed on Mar. 28, 2013.

(51) Int. Cl.
A01K 85/01 (2006.01)
A01K 83/00 (2006.01)

(52) U.S. Cl.
CPC .............. A01K 85/01 (2013.01); A01K 83/00 (2013.01)

(58) Field of Classification Search
CPC ......... A01K 83/00; A01K 85/01; A01K 83/06
USPC .... 43/43.16, 42.31, 44.81, 44.8, 44.2, 44.82
See application file for complete search history.

(56) References Cited

U.S. PATENT DOCUMENTS

| | | | | |
|---|---|---|---|---|
| 2,763,954 A | * | 9/1956 | Bunker | A01K 85/01 43/42.31 |
| 2,826,855 A | * | 3/1958 | Troccia | A01K 83/00 24/635 |
| 2,865,131 A | * | 12/1958 | Ellis | A01K 83/00 43/43.16 |
| 2,995,858 A | * | 8/1961 | Rathmann | A01K 83/00 43/44.8 |
| 3,430,378 A | * | 3/1969 | Sweeney | A01K 83/00 43/44.8 |
| 3,848,353 A | * | 11/1974 | McClellan | A01K 85/01 43/42.31 |
| 3,935,660 A | * | 2/1976 | Plew | A01K 85/01 43/42.31 |
| 3,988,851 A | * | 11/1976 | Sacharnoski, Sr. | A01K 85/01 43/42.31 |
| 4,015,363 A | * | 4/1977 | Sedlak | A01K 85/00 43/42.22 |
| 4,203,246 A | * | 5/1980 | Sacharnoski, Sr. | A01K 85/01 43/42.31 |

(Continued)

FOREIGN PATENT DOCUMENTS

GB 2487586 A * 8/2012 ............. A01K 83/00
JP 09313082 A * 12/1997

(Continued)

OTHER PUBLICATIONS

Rockport Rattler by Chicky Tackle, CroakerMAX Jigs, website: www.rockportrattler.com, 2 pages, Jan. 29, 2014.

(Continued)

Primary Examiner — Darren W Ark
(74) Attorney, Agent, or Firm — Eldredge Law Firm, LLC; Richard Eldredge; Beth Felix

(57) ABSTRACT

A fish hook design for providing sound, the audible sound device integrated to the shank portion. A user can sleeve bait over the shank portion, including the sound device. The user uses the hook as normal with the production of sound by the audible sound device.

2 Claims, 3 Drawing Sheets

(56) References Cited

U.S. PATENT DOCUMENTS

| | | | | |
|---|---|---|---|---|
| 4,414,772 A * | 11/1983 | Duncan | A01K 85/16 43/42.29 |
| 4,791,750 A * | 12/1988 | Gammill | A01K 85/01 43/42.31 |
| 4,995,189 A * | 2/1991 | Crihfield | A01K 85/01 43/42.31 |
| 5,001,856 A * | 3/1991 | Gentry | A01K 85/01 43/42.31 |
| 5,024,019 A * | 6/1991 | Rust | A01K 85/01 43/42.31 |
| 5,038,513 A * | 8/1991 | Hardin | A01K 85/01 43/42.31 |
| 5,121,568 A * | 6/1992 | Lindmeyer | A01K 85/01 43/42.31 |
| 5,230,178 A * | 7/1993 | Dillard | A01K 83/06 43/42.31 |
| 5,237,771 A * | 8/1993 | Watson | A01K 85/01 43/17.1 |
| 5,335,443 A * | 8/1994 | Grigsby, Jr. | A01K 85/00 43/44.81 |
| 5,381,622 A * | 1/1995 | Tregre | A01K 85/01 43/42.31 |
| 5,428,919 A * | 7/1995 | Enomoto | A01K 85/01 43/42.31 |
| D397,758 S * | 9/1998 | Magers | D22/126 |
| 5,890,315 A * | 4/1999 | Norton | A01K 85/14 43/42.31 |
| 5,890,317 A * | 4/1999 | Hollomon | A01K 85/00 43/42.31 |
| 5,946,847 A * | 9/1999 | North | A01K 85/01 43/42.31 |
| 5,992,085 A * | 11/1999 | Schultz | A01K 83/06 43/44.8 |
| 6,006,464 A * | 12/1999 | Tregre | A01K 95/00 43/42.31 |
| 6,047,492 A * | 4/2000 | Watson | A01K 85/01 43/17.1 |
| 6,155,000 A * | 12/2000 | Ravencroft | A01K 85/01 43/42.13 |
| 6,560,916 B1 * | 5/2003 | Maxim | A01K 83/00 43/43.16 |
| 6,651,376 B1 * | 11/2003 | Link | A01K 85/01 43/42.31 |
| 6,766,608 B1 * | 7/2004 | Jelmyer | A01K 83/06 43/43.16 |
| 6,836,996 B1 * | 1/2005 | Huppert | A01K 85/00 43/42.39 |
| 6,910,297 B1 * | 6/2005 | Sitton | A01K 83/00 43/43.16 |
| 7,036,266 B2 * | 5/2006 | Falcon | A01K 85/00 43/44.81 |
| 1,125,535 A1 | 10/2006 | Trembone et al. | |
| 7,124,535 B2 * | 10/2006 | Trembone | A01K 85/01 43/17.6 |
| 7,146,764 B1 * | 12/2006 | Naumovitz | A01K 85/01 43/42.31 |
| 7,159,357 B2 * | 1/2007 | Sitton | A01K 83/00 43/43.16 |
| 7,530,194 B1 * | 5/2009 | Wrape | A01K 83/00 43/26.1 |
| 7,614,178 B2 * | 11/2009 | Hoyt | A01K 85/01 43/42.31 |
| 9,173,385 B2 * | 11/2015 | Cooper | A01K 85/02 |
| 2004/0200125 A1 * | 10/2004 | Albanito | A01K 85/01 43/42.36 |
| 2004/0237375 A1 * | 12/2004 | Jelmyer | A01K 83/06 43/44.2 |
| 2006/0053678 A1 * | 3/2006 | Amsler | A01K 95/00 43/42.31 |
| 2007/0124985 A1 * | 6/2007 | Sitton | A01K 83/00 43/43.16 |
| 2007/0234635 A1 * | 10/2007 | Lewis | A01K 85/08 43/44.81 |
| 2009/0084021 A1 * | 4/2009 | Bialobrzeski | A01K 85/01 43/42.31 |
| 2009/0113783 A1 * | 5/2009 | Hollomon | A01K 85/01 43/42.31 |
| 2010/0107469 A1 * | 5/2010 | Dunkerley | A01K 85/01 43/42.31 |
| 2013/0067794 A1 * | 3/2013 | Hunter | A01K 95/02 43/44.81 |
| 2016/0113257 A1 * | 4/2016 | Harrington | A01K 85/01 43/42.31 |

FOREIGN PATENT DOCUMENTS

| | | | | |
|---|---|---|---|---|
| JP | 2001028970 A * | 2/2001 | |
| KR | 200466572 Y1 * | 4/2013 | |
| KR | 101353056 B1 * | 1/2014 | |
| WO | WO 2015012701 A1 * | 1/2015 | A01K 83/00 |

OTHER PUBLICATIONS

Rockport Rattler by Chicky Tackle, XMAX Jigs, website: www.rockportrattler.com, 2 pages, Jan. 29, 2014.

* cited by examiner

RATTLING FISH HOOK

CROSS REFERENCE TO RELATED APPLICATIONS

This application claims the benefit of U.S. provisional patent application Ser. No. 61/853,082, filed Mar. 28, 2013.

FIELD OF THE INVENTION

This invention relates to fish hooks, specifically to fish hooks equipped with rattles.

BACKGROUND OF THE INVENTION

Fish hooks are commonly used with baits. Examples of baits include live fish such as shad, worms, non-live food such as shad, chicken, various catfish doughs and punch baits, and artificial lures such as soft plastics. The baits are enhanced by strategic add on devices to include weight, illumination, audible sound and secondary attachment devices for baits.

Rattles in particular are desirable to use when fishing. As the baited hook is moved in the water, the rattle produces noise. Water is an excellent sound conductor. Fish are attracted to the noise. However, strategic add on devices, such as rattles, can cause several problems for the purpose applying the bait to the hook. Baits such as soft plastics are primarily thread from the sharp end of the hook; a portion of the bait is sleeved over the sharp end of the hook along the shank of the hook until it reaches a resting place usually near the line tie eyelet. The same bait may then be attached again to the sharp end of the hook in a manner consistent to accomplish the strategic natural presentation of the chosen bait and provide a weed guard which is strategic in helping to prevent snags and hang ups of the hook. Strategic add on devices such as illumination, weight and audible sounding devices that significantly alter the diameter of the hook shank can encumber the user's ability to sleeve the bait increasing risk of personal injury and bait damage or loss of bait. Recreation of fishing is time for one to enjoy life and well intentioned anglers have used add on devices that can cause complexity issues as well as unnecessary expense and risk.

In the prior art, rattles have been attached to hooks. In Hoyt, U.S. Pat. No. 7,614,178, a jig head has a hook. Attached to the jig head is a rattle that extends adjacent to the hook shank. Together, the rattle and the shank enlarge the size of the hook in cross-section. Many baits cannot be used on such a hook because they cannot be secured to the hook. In addition, using soft plastic lures on such a hook would result in damage to the lure so it could not be reused.

Huppert, U.S. Pat. No. 6,836,996 attaches a rattle to the bend portion of the hook by way of a wire. The hook also includes a weight on the shank.

Thus what is needed is a hook having a more streamlined rattle that can be used with a wide variety of baits and without damage to the baits.

In U.S. Pat. No. 7,124,535 Trembone, et al. 2006, shows illumination feature, which is a coveted strategy in catching fish. The light unit is located along side the shank. Together, the light unit and the shank enlarge the size of the hook, which limits the bait choice. The light unit interferes with securely attaching a bait to the hook. While a few specialized baits could be used, these baits cannot be rigged as weedless where the hook tip is inside the bait. A weedless rigged bait reduces snags and hang ups thereby reducing the frustrations and time that go along with trying to disengage the snag or hang up which many times end in an environmental problem of littering our lakes ponds and streams with dangerous sharps and excess fishing line. This problem affects all aquatic life and human life and other fisherman lines as they could become entangled.

In U.S. Pat. No. 7,036,266 Falcon 2006, shows weighted hook shank with a significant increase in the diameter, although it is complimentary to show the needed reduction in as far as the tapered ends of both top and bottom beginning and ending of the weight for applying baits. The weight is concentrically fitted onto the shank but not secured and held in position by the tapered ends of the weight. The weight could at the same time take advantage of the space used for the weight by adding a component of the audible sound device however this is not present. The selection of creating the space along the hook for purposes of audible sound naturally adds the weight from weighted members within, and thereby combining strategic benefits.

DESCRIPTION OF THE PREFERRED EMBODIMENT

Figure 1:
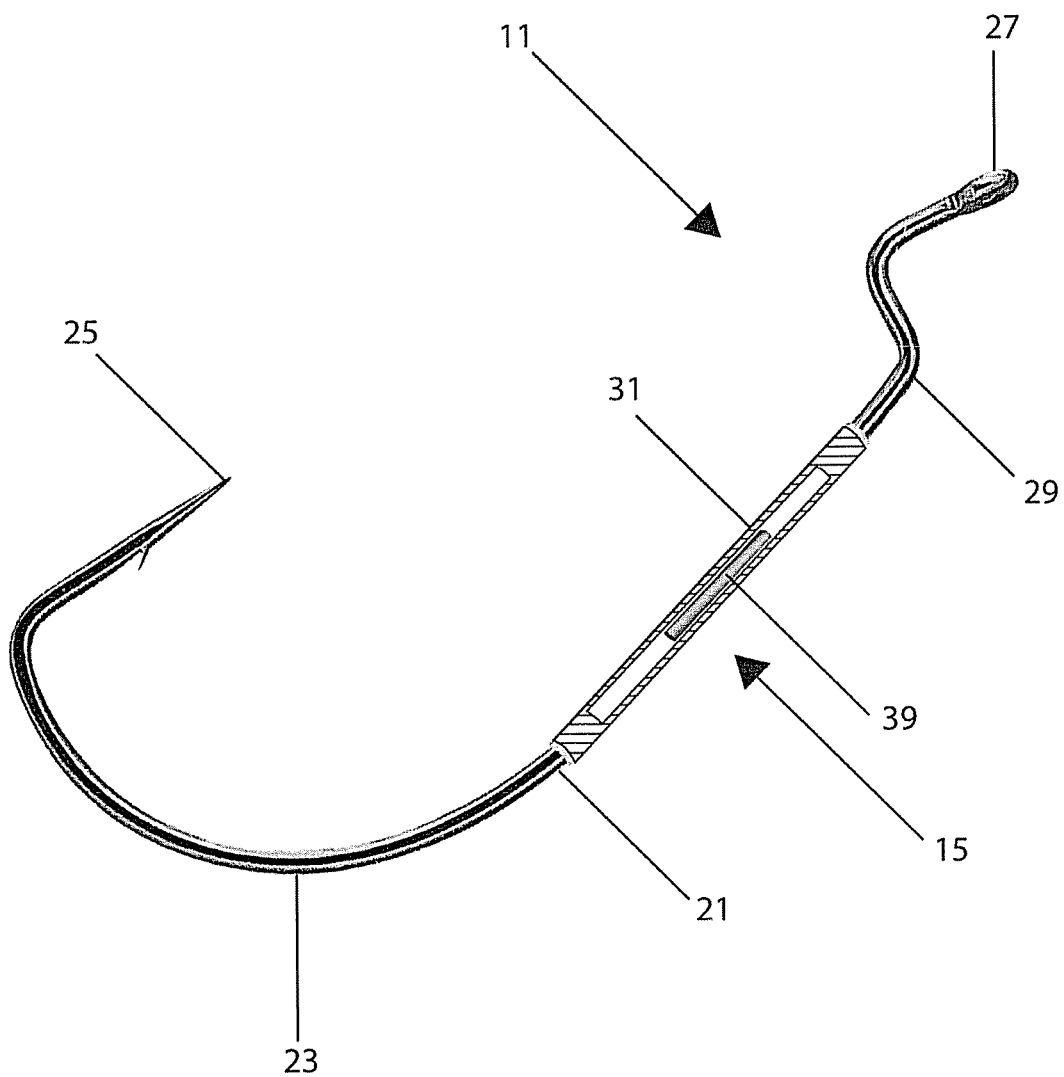
FIG. 1 is a side view of the hook of the present invention, in accordance with a preferred embodiment, showing the rattle in cross-section.

As shown in the drawings, the fish hook 11 is equipped with a rattle portion 15 in such a manner that a wide variety of baits can be securely attached to the hook. For example, a soft plastic lure 17 can be inserted onto the hook. The rattle portion 15 only slightly increases the diameter of the hook so that the soft plastic lure can be reused on the same hook or on another hook without having to retie a knot. The lure is not destroyed or modified significantly when inserted onto the hook. By embedding the rattle in the fish hook, less expensive baits can be used. A rattle equipped bait is typically more expensive than a non-rattling bait.

Referring to FIG. 1, the fish hook 11 has a shank 21, a bend 23, a point 25 or tip and a line connector 27. The point 25 can be barbed as shown or barbless. Some fishing locations require the use of barbless hooks. The bend 23 connects the point 25 to the shank 21. The shank 21 extends from the bend 23 to the line connector 27. In the embodiment shown, the line connector is an eye 27. However, the line connector could be any device used to connect a hook to a line such as a swivel, jig head, clip, etc. The shank 21 need not be straight and may contain one or more bends 29 or turns. While the hook generally has the shank, bend and point flat so as to lie in a plane, the hook can be shaped so that one or more sections lay outside of the plane. For example, the bend and point may be bent to one side of the plane. Also, the hook can be of various designs. For example as shown, the bend is about 180 degrees, where the point generally points back towards the line connector. However, circle hooks have a larger bend so the point may point in the direction of the shank.

Figure 2:
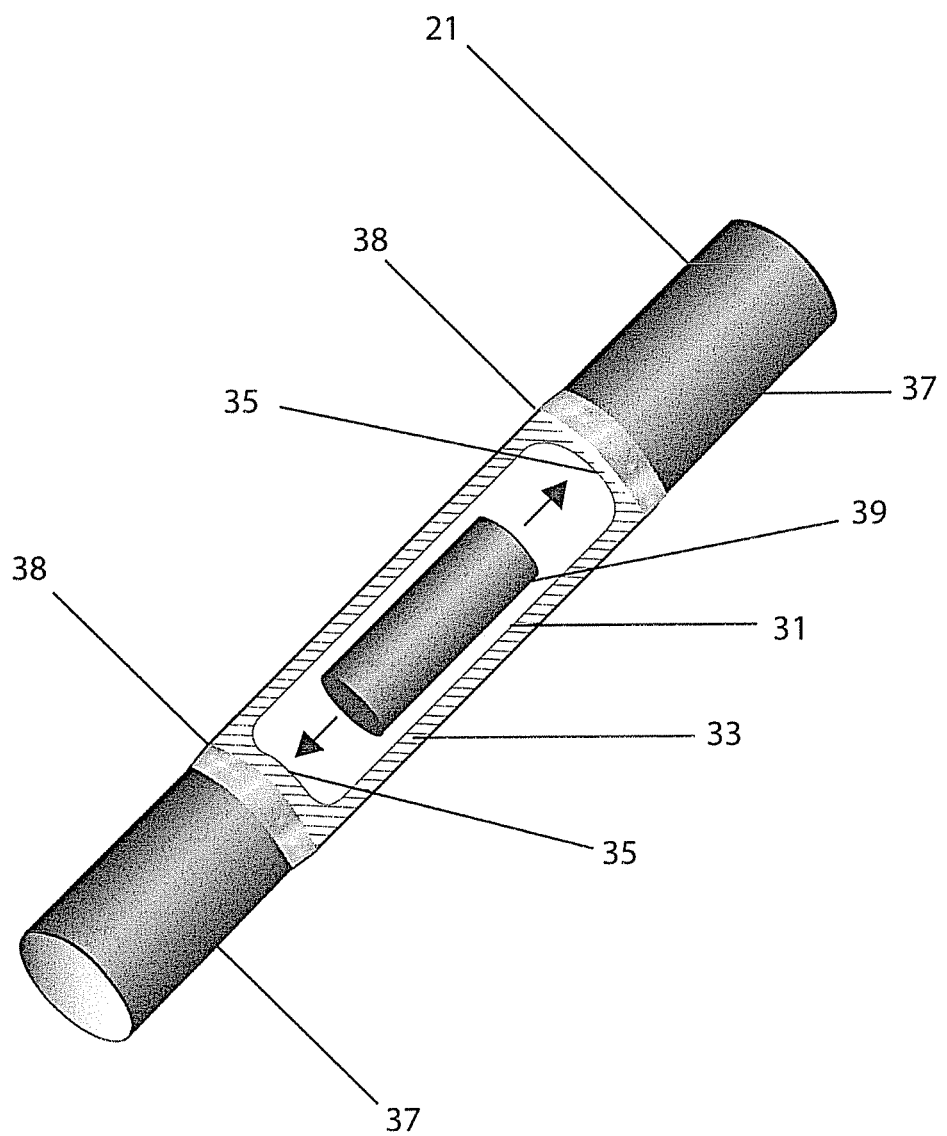
FIG. 2 is detailed cross-sectional view showing the rattle.

The rattle portion 15 is part of and in line with the shank 21 of the hook. The rattle portion 15 has a chamber 31 and a rattle 39. As shown in FIG. 2, the chamber 31 has a side wall 33 and ends 35. The chamber 31 is elongated and extends along a portion of the shank length. Thus, the shank has non-chamber portions 37 located in line with the chamber. The chamber has a first diameter, while the non-chamber portions 37 have a second diameter. The first diameter is larger than the second diameter. The outside ends of the chamber are tapered 38. This eases the insertion of a lure or bait onto the hook.

In the preferred embodiment, the chamber 31 is watertight so that water does not enter the chamber when the hook is in use.

Inside the chamber 31 is one or more rattles 39. In the preferred embodiment, the rattle 39 is a metal cylinder. However, the rattle could be a bead or other shape and made of other material such as plastic. Using a metal cylinder as a rattle serves to add weight to the hook and may reduce the need for an angler to add weight to the bait or lure.

The length of the chamber 31, which is the distance between the ends 35, is sufficient to allow the rattle 39 to move from one end 35 in the chamber to the other end. The rattle 39 generally makes noise when contacting an end 39 of the chamber. The rattle may make noise as well when moving inside of the chamber as it moves along the side wall 33. The diameter of the rattle is sized relative to the inside diameter of the chamber so that the rattle can freely move between the ends 35 of the chamber. In some embodiments, the chamber may be sized somewhat larger than the rattle so as to allow the rattle to move in a transverse direction and make noise when contacting the side wall of the chamber. As used herein, the longitudinal direction of the chamber is the direction the rattle moves inside of the chamber between the ends 35, which is generally collinear with the shank.

To make the hook, a length of the tubing is used for the chamber. Conventional hooks are made of wire. If a conventional hook is being modified, a length of the shank is cut out and removed so as to leave a gap. The sleeve or tubing is inserted into the gap and the ends of the tubing are joined to the hook pieces by soldering, brazing, welding, etc. The rattle is located inside of the sleeve before the tubing is joined to the hook pieces. The outside ends 38 of the chamber are tapered.

In such an embodiment, the chamber is integral with the non-chamber portions 37 and the remainder of the hook. However, in the alternative, the rattle portion can be removably coupled to the hook, for example, by way of threaded connections.

Figure 3:
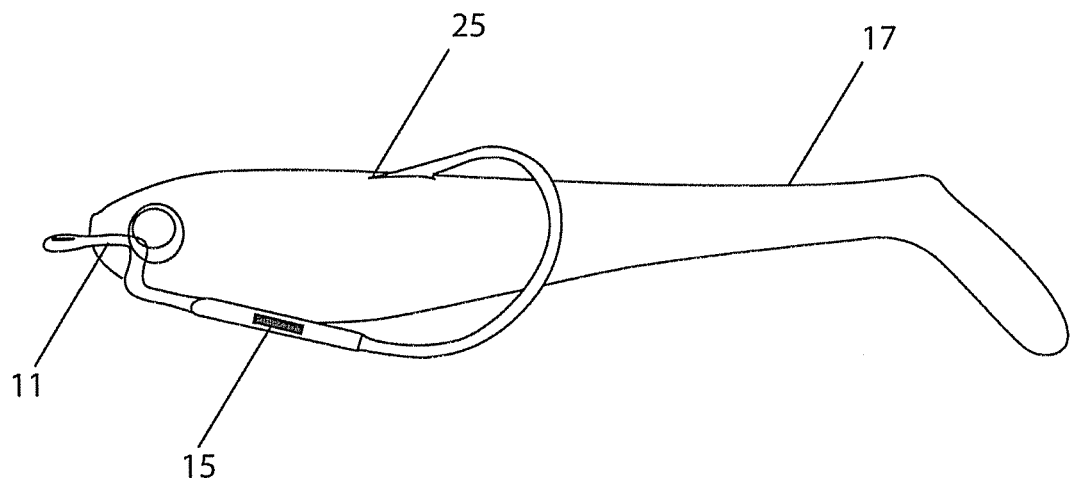
FIG. 3 is a side view of the hook as may be used with a bait.

The hook is used as an ordinary hook is used. As shown in FIG. 3, for example, a soft plastic lure 17 has been inserted onto the hook in accordance with conventional techniques. For example, the point of the hook is inserted into the foreign end of the lure and the lure then follows the bend and the shank until it contacts the line connector 27. The hook shown in the figure is rigged in a weedless manner, but it may also be rigged in an exposed manner.

By providing the rattle in line with the remainder of the hook shank, any type of bait or lure can be easily inserted onto the hook. When used during fishing as the lure moves in the water, the rattle 39 moves inside of the chamber 31 making noise which is then conveyed into the surrounding water. Fish are highly attracted to such a configuration.

The foregoing disclosure and showings made in the drawings are merely illustrative of the principles of this invention and are not to be interpreted in a limiting sense.

The invention claimed is:

1. A fish hook, comprising:
    a) a shank, a bend, a point and a line connector, the shank having a length;
    b) the shank having a shank chamber having a first diameter extending along a portion of the shank length, the shank having first and second solid non-chamber portions having a second diameter, the first diameter being larger than the second diameter, the shank chamber being both in line with and located between the first and second solid non-chamber portions, the shank chamber having opposing ends that are permanently sealed to create a watertight chamber, each of the opposing ends of the shank chamber being integral with a respective one of the first and second solid non-chamber portions and tapering toward the respective one of the first and second solid non-chamber portions; and
    c) a rattle located in the shank chamber, the rattle is a metal cylindrical rod disposed within the shank chamber and configured to slide therein; and
    wherein sound is created by the rattle within the shank chamber when an end of the rattle comes into contact with an inner surface of the shank chamber.

2. The fish hook of claim 1, wherein the line connector is an eye.

* * * * *